(12) United States Patent  (10) Patent No.: US 7,757,053 B2
Kim et al.  (45) Date of Patent: Jul. 13, 2010

(54) APPARATUS AND METHOD FOR MANAGING STACKS FOR EFFICIENT MEMORY USAGE

(75) Inventors: Min-chan Kim, Suwon-si (KR); Gyong-jin Joung, Seongnam-si (KR); Young-jun Jang, Suwon-si (KR)

(73) Assignee: Samsung Electrnoics Co., Ltd., Suwon-si (KR)

( * ) Notice: Subject to any disclaimer, the term of this patent is extended or adjusted under 35 U.S.C. 154(b) by 434 days.

(21) Appl. No.: 11/831,221

(22) Filed: Jul. 31, 2007

(65) Prior Publication Data

US 2008/0172530 A1 Jul. 17, 2008

(30) Foreign Application Priority Data

Jan. 15, 2007 (KR) .................... 10-2007-0004340

(51) Int. Cl.
*G06F 12/00* (2006.01)
(52) U.S. Cl. .................. 711/154; 711/132; 711/165; 711/170; 711/206
(58) Field of Classification Search .............. 711/154, 711/132, 165, 170, 206
See application file for complete search history.

(56) References Cited

U.S. PATENT DOCUMENTS

| 5,956,735 | A | 9/1999 | Clark et al. | |
|---|---|---|---|---|
| 6,879,266 | B1 * | 4/2005 | Dye et al. | 341/51 |
| 7,617,381 | B2 * | 11/2009 | Kim et al. | 711/209 |
| 2003/0135694 | A1 | 7/2003 | Naffziger et al. | |
| 2005/0102491 | A1 | 5/2005 | Yamamoto | |
| 2007/0055843 | A1 * | 3/2007 | Lameter | 711/206 |

FOREIGN PATENT DOCUMENTS

| JP | 10-283229 | 10/1998 |
|---|---|---|
| JP | 2004-62220 | 2/2004 |
| KR | 2001-7058 | 1/2001 |

* cited by examiner

*Primary Examiner*—Stephen C Elmore
(74) *Attorney, Agent, or Firm*—NSIP Law

(57) ABSTRACT

An apparatus and method for managing stacks for efficient memory usage. The apparatus includes a fault cause analysis unit to recognize a page fault caused by a marking page; a control unit to set the marking page, to request compression of a first stack page depending on whether a page fault occurs, to release a mapping of a second stack page that becomes empty due to the compression, and to return the second stack page; a memory allocation unit to receive the second stack page and to allocate a new stack page to the control unit upon completion of the compression; and a compression unit to compresses the first stack page at the request of the control unit.

20 Claims, 9 Drawing Sheets

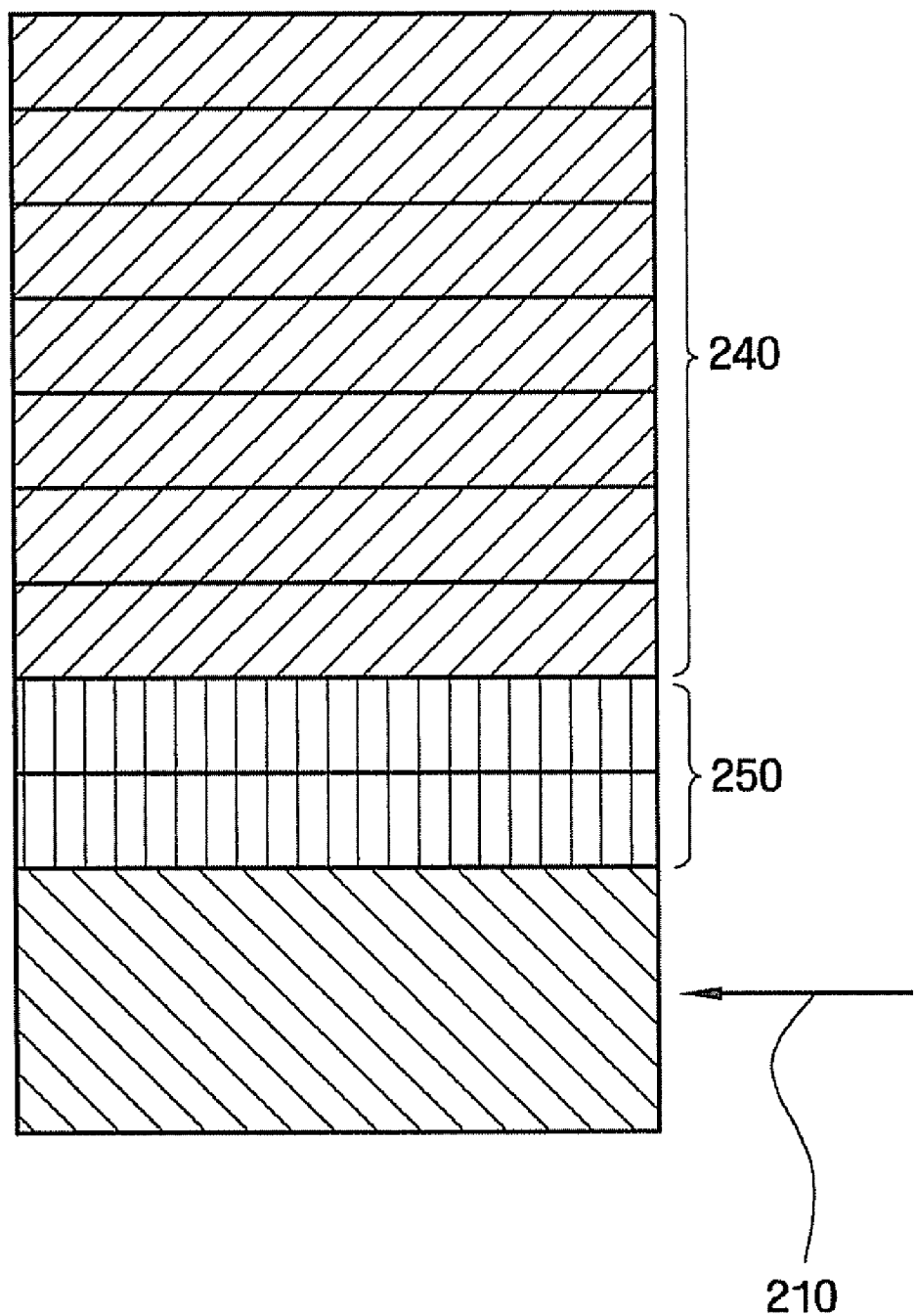

APPARATUS AND METHOD FOR MANAGING STACKS FOR EFFICIENT MEMORY USAGE

CROSS-REFERENCE TO RELATED APPLICATION

This application claims the benefit of Korean Patent Application No. 2007-4340, filed in the Korean Intellectual Property Office on Jan. 15, 2007, the disclosure of which is incorporated herein by reference.

BACKGROUND OF THE INVENTION

1. Field of the Invention

Aspects of the present invention relate to efficient management of stacks of an application for efficient memory acquisition for an operating system and, more particularly, to an apparatus and method that can ensure large capacity memory acquisition for an operating system by storing a stack region exceeding a predetermined range in a compressed format.

2. Description of the Related Art

Conventionally, securing memory has been carried out by retrieval of data in a read-only region, retrieval of a dirty page, or retrieval of an anonymous page using a swap space. The retrieval of the data in the read-only region uses the characteristics of the data in the read-only region. Since a code of an application to be executed is read-only, the code is not changed during the execution of the application. An image of an execution file can be temporarily erased from a memory because the image has already been stored. Thus, by retrieving the data in the read-only region, free space in the memory can be acquired efficiently.

The operating system does not immediately write a page in a file, change the page in the memory, and mark the page as a dirty (changed) page. Instead, when there is insufficient memory space, free space of the memory is acquired by writing the dirty page in a file and retrieving the dirty page.

The anonymous page indicates a page, such as a heap or a stack, that is not related to an image of a file and is dynamically generated during the execution of an application. If a space that can be swapped exists in a system, a free space of the memory can be acquired such that the anonymous page of the application swaps out, referred to as the retrieval of the anonymous page using the swap space.

FIG. 1 is a conceptual view illustrating memory allocation during the execution of an application according to the prior art. In general, once a specific function 101 of an application is compiled and is executed in assembly language, a predetermined stack 103 of a memory is allocated for the execution of the application according to assembly language. Similarly, upon execution of another function 102, a predetermined stack 104 is allocated according to interpreted assembly language. In this way, if an application is executed, only a portion of the entire region of the memory, instead of the entire region of the memory, is intensively used, which is called locality. Currently used embedded systems do not include a swap space and thus cannot use retrieval of an anonymous page, nor do currently used methods consider a usage pattern of a stack having strong locality.

FIGS. 2A and 2B are conceptual views illustrating stack usage of an application according to the prior art. In FIG. 2A, a first region 220 indicates currently used stack pages in a memory and a second region 230 indicates a stack page that has not yet been allocated. A current stack pointer 210 is positioned at a boundary between the first region 220 and the second region 230, i.e., between the last allocated stack page and a non-allocated stack page. Upon execution of an application, more stack pages are allocated as the number of functions to be processed increases, as illustrated in FIG. 2B.

In FIG. 2B, a first region 240 indicates currently used stack pages in a memory and a second region 250 indicates frequently referred stack pages. The current stack pointer 210 is positioned between the last allocated stack page and a non-allocated stack page. The first region 240 is used, but is not frequently referred to, unlike the second region 250. Thus, the memory space that is available to the operating system decreases due to the first region 240.

SUMMARY OF THE INVENTION

Aspects of the present invention provide an apparatus and method for managing stacks for efficient memory usage, in which a larger free memory space for an operating system is acquired by minimizing the size of a stack page in a memory used by an application.

According to an aspect of the present invention, an apparatus to manage stacks for efficient memory usage is provided. The apparatus includes a fault cause analysis unit to recognize a page fault caused by a marking page, a control unit to set the marking page, to request compression of a first stack page depending on whether a page fault occurs, to release a mapping of a second stack page that becomes empty due to the compression, and to return the second stack page; a memory allocation unit to receive the second stack page from the control unit and to allocate a new stack page to the control unit upon completion of the compression; and a compression unit to compress the first stack page at the request of the control unit.

According to another aspect of the present invention, a method for managing stacks for efficient memory usage is provided. The method includes setting a marking page in a first stack page, generating a page fault due to the marking page, requesting compression of a second stack page depending on whether a page fault occurs and compressing the second stack page in response to the request, and releasing a mapping of a third stack page that becomes empty due to the compression and returning the third stack page.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIGS. 2A and 2B are conceptual views illustrating stack usage of an application according to the prior art;

DETAILED DESCRIPTION OF THE EMBODIMENTS

Figure 1:
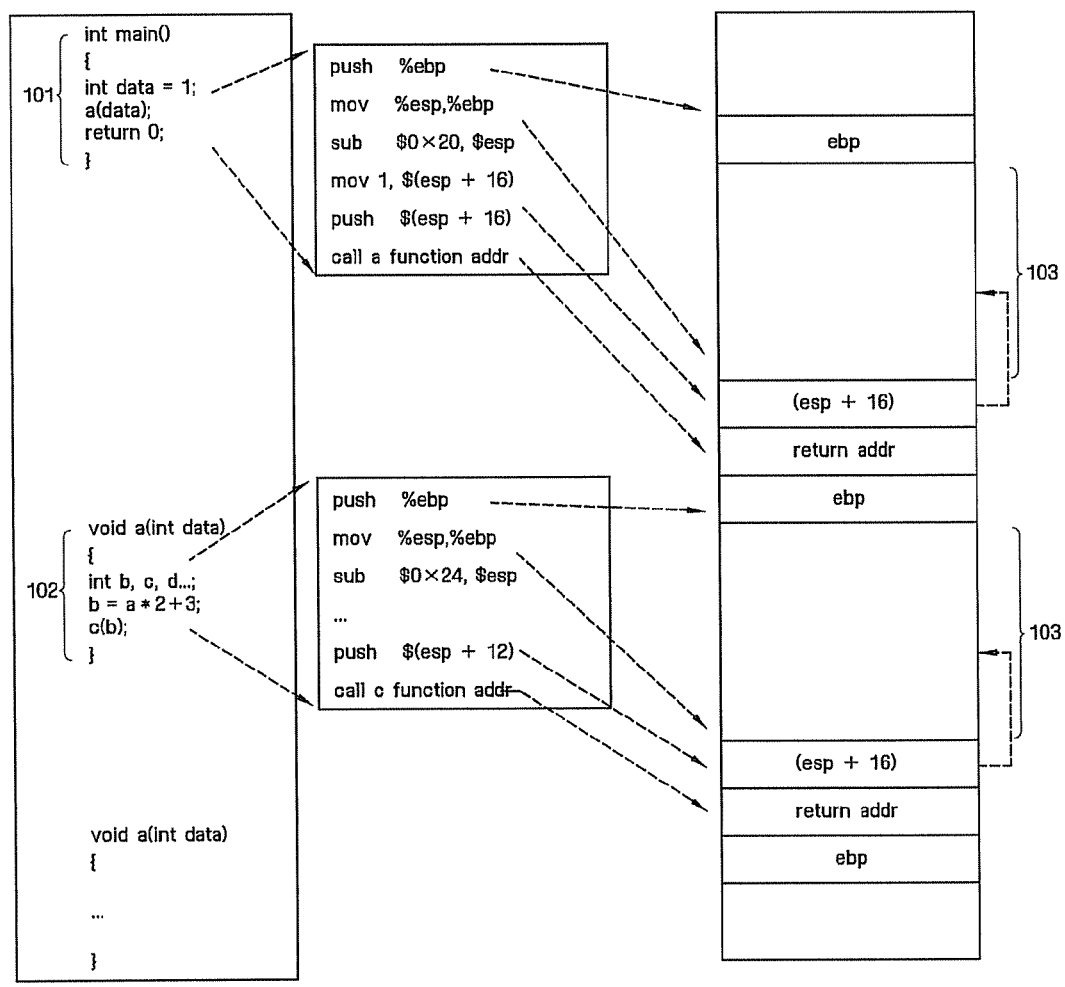
FIG. 1 is a conceptual view illustrating memory allocation for an application according to the prior art.
Figure 2A:
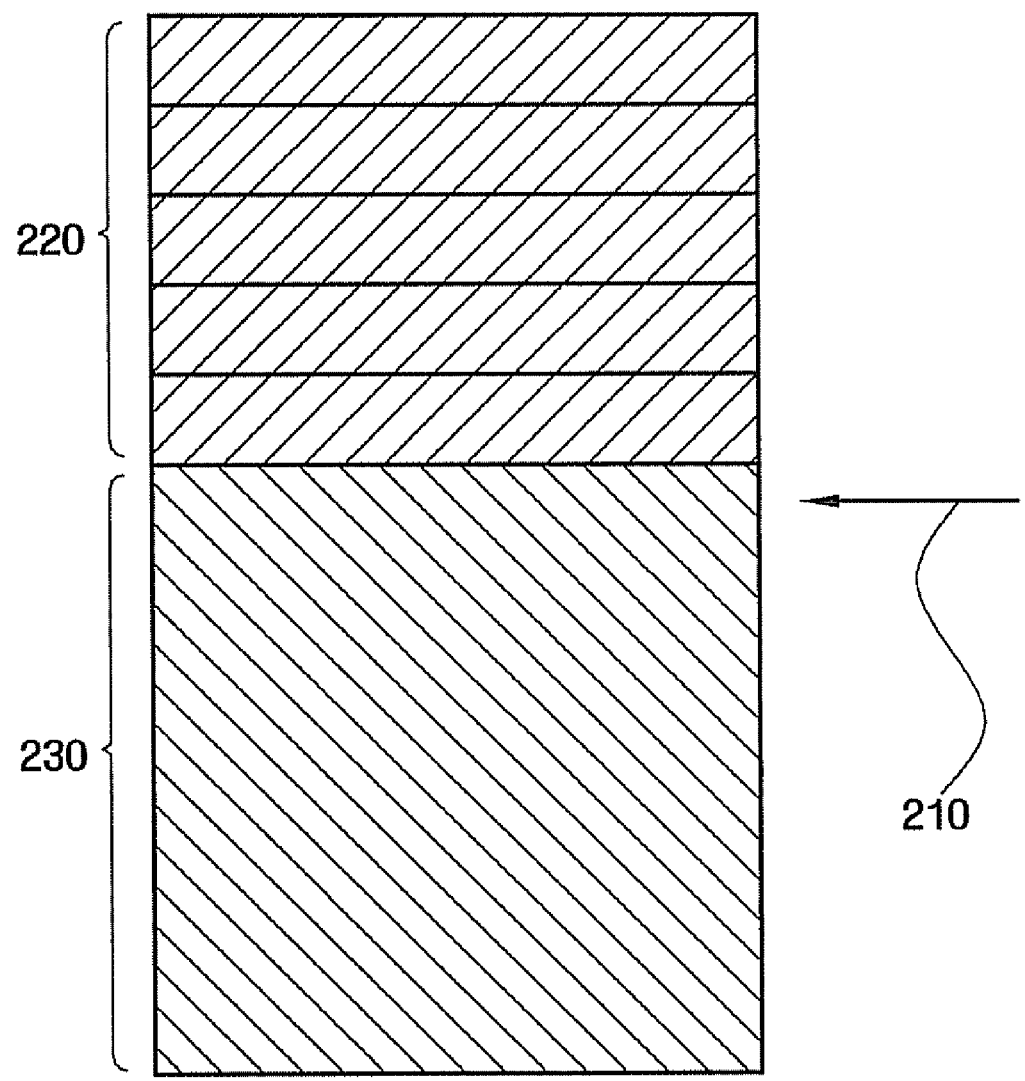

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 3:
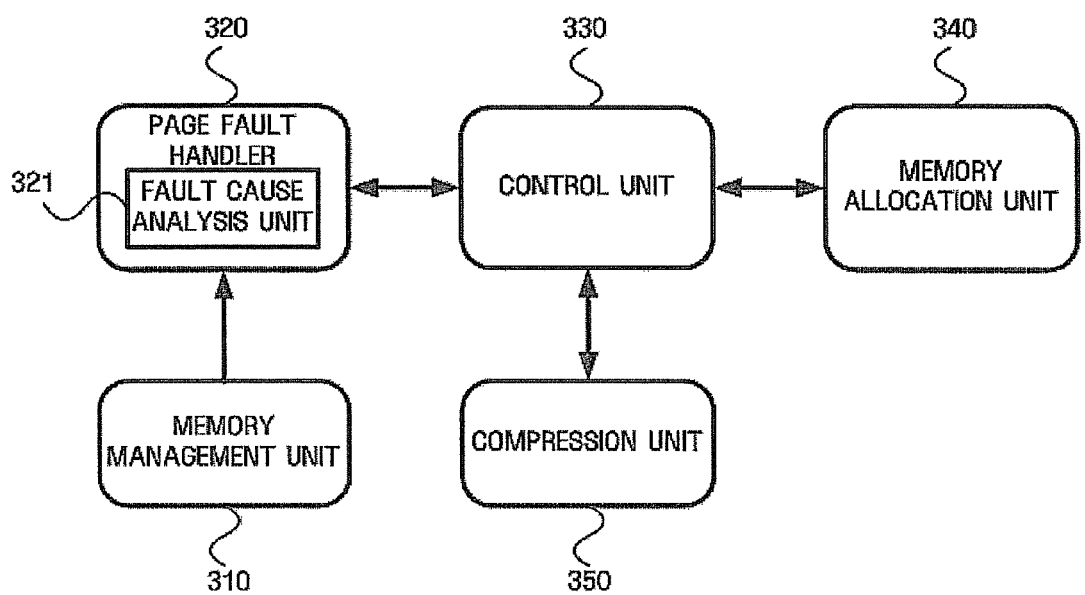
FIG. 3 is a block diagram of an apparatus for managing stacks for efficient memory usage according to an embodiment of the present invention.

FIG. 3 is a block diagram of an apparatus 300 for managing stacks for efficient memory usage according to an embodiment of the present invention. The apparatus 300 includes a memory management unit (MMU) 310, a page fault handler 320, a control unit 330, a memory allocation unit 340, and a compression unit 350. According to other aspects of the invention, the apparatus may include additional units as well. The apparatus 300 may be a part of a computer, portable computer, digital camera, mobile phone, personal digital assistant, personal entertainment device, embedded system, or any device where memory is at a premium.

The term 'unit', as used herein, refers to, but is not limited to, a software component that is capable of being executed by a processor or a hardware component that performs certain tasks, such as a Field Programmable Gate Array (FPGA) or an Application Specific Integrated Circuit (ASIC). A unit may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units. In addition, the components and units may be implemented such that they execute on one or more computers in a communication system.

The memory management unit 310 is a hardware component for managing a memory system such as a virtual memory system. The memory management unit 310 may be implemented as a separate chip or may be implemented as part of a central processing unit (CPU) according to the design needs of the apparatus 300 or the device into which the apparatus 300 is incorporated. The memory management unit 310 has a small-capacity memory in order to hold a table required for mapping a virtual memory to a real memory.

The page fault handler 320 manages an occurring page fault. A page fault is an interrupt to software, which is generated by hardware when a program accesses a page that is not mapped to a physical memory. The page fault handler 320 manages such a page fault when the page fault occurs.

The interrupt is a signal coming from a device mounted on a computer or program in the computer and causes the operating system to stop the current ongoing task and then to determine which task is to be performed next. These days, most personal computers or large-scale computers are interrupt-based systems: once a computer command in a program starts, the computer cannot continue the ongoing task or execute commands until an interrupt signal is detected. If the interrupt signal is detected, the computer resumes execution of an ongoing program or starts execution of another program. Although a single computer can execute a single computer command at a time, the computer can also execute another program or command at that time due to the interrupt signal. Such an operation is called multi-tasking, which enables a user to perform several tasks at a time.

The page fault handler 320 includes a fault cause analysis unit 321. The apparatus 300 generates a fault when a current stack pointer points to a marking page. The fault cause analysis unit 321 recognizes that the generated fault is caused by the marking page. The marking page will be described later with respect to the control unit 330.

The control unit 330 requests the memory allocation unit 340 to allocate a new stack page, manages the marking page, and requests the compression unit 250 to compress or decompress a currently used stack page.

Figure 4A:
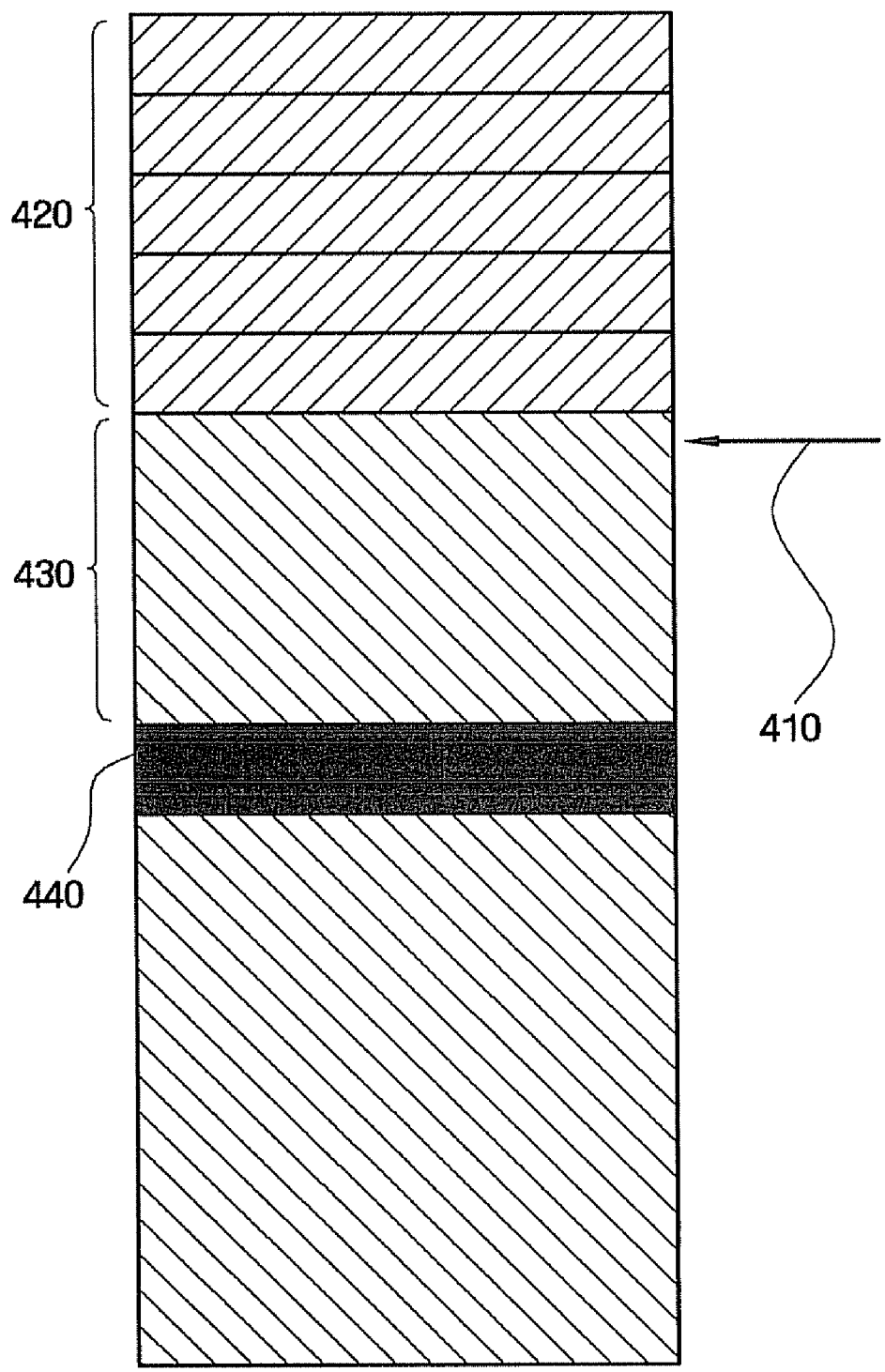
FIGS. 4A through 4C are conceptual views illustrating management of a marking page with a control unit according to an embodiment of the present invention.

In FIG. 4A, a first region 420 indicates currently used stack pages, a second region 430 indicates a non-allocated stack page, and a third region 440 (marked with black) indicates a marking page. A current stack pointer 410 points to a stack page scheduled to be allocated by the memory allocation unit 340 to a process of an application at the request of the application. The process of the application is an instance of a program that is being executed in the computer, and is similar to the term "task" used in several operating systems. In other operating systems such as UNIX, a process starts with a start of a program. Like a task, the process is a program that is being executed in association with a particular data set for tracking and managing the process.

The control unit 330 sets the marking page by marking a page as a read-only region, maintaining the page as unmapped, and generating a hardware fault when the page is written in a region that is set as the marking page. The marking page serves to indicate a compression point of time of a stack page. The marking page may be at least one of an unmapped stack page, a read-only stack page, and a page that is set to cause the generation of the page fault when being written. As used herein, "at least one of" refers to any combination of one or more items. Thus, for example, the marking page may be any one of an unmapped stack page, read-only stack page, or stack page set to cause the generation of the page fault when being written, any two, or all three.

Figure 4B:
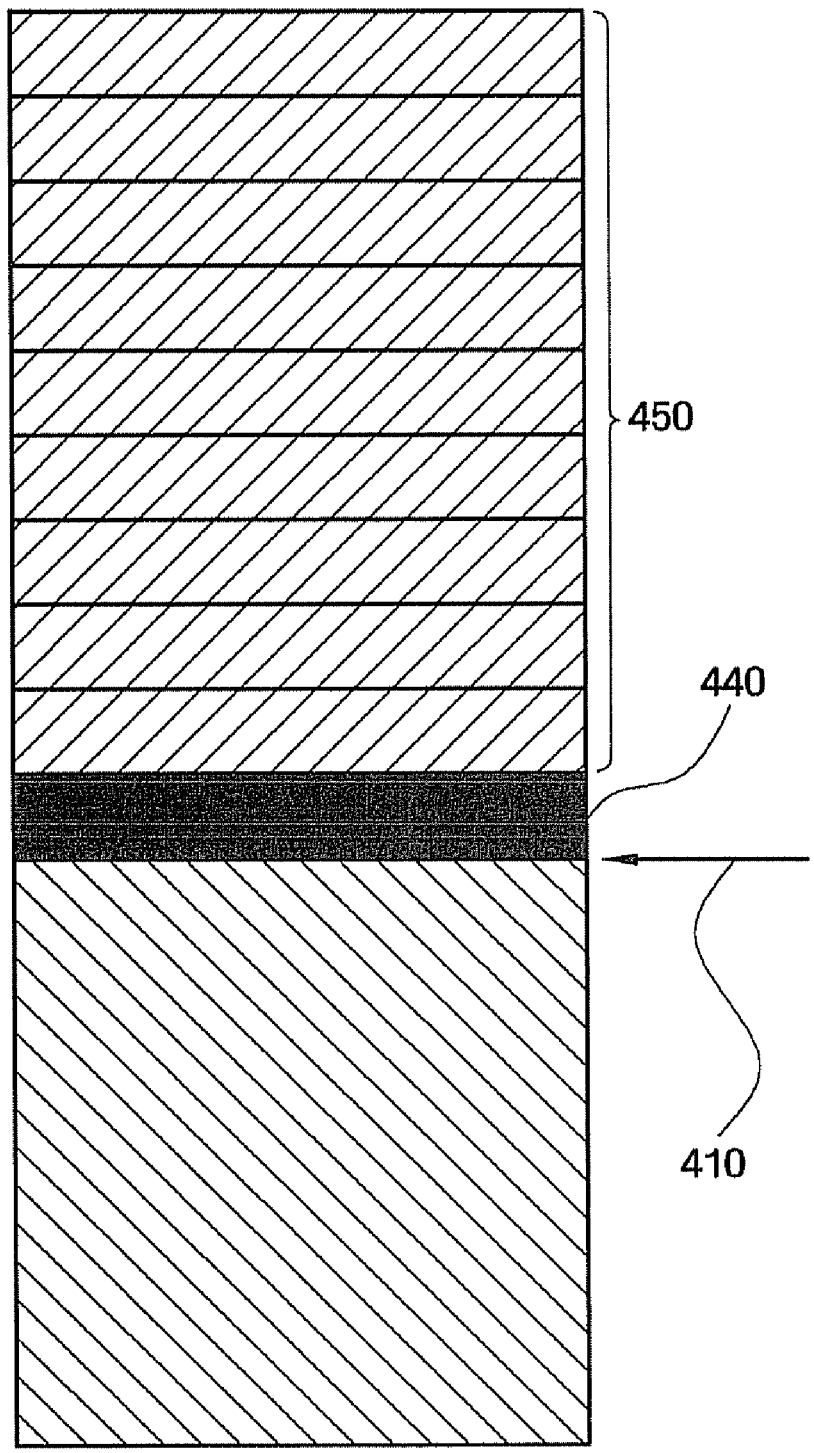
Figure 4C:
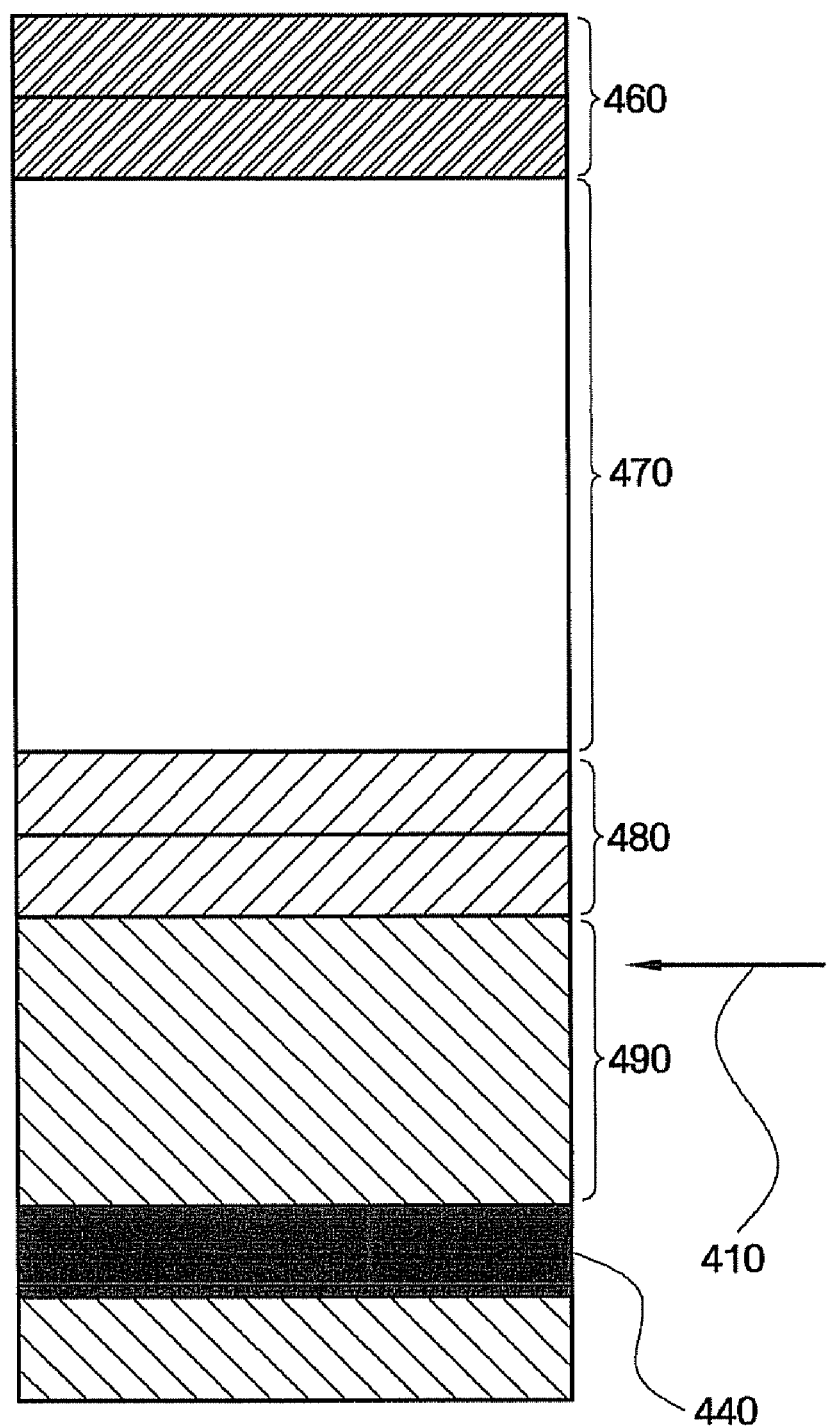

FIGS. 4A through 4C are conceptual views illustrating management of a marking page with a control unit according to an embodiment of the present invention. In FIG. 4A, since the current stack pointer 410 is a pointer for the second region 430 including the non-allocated stack pages, the memory allocation unit 340 allocates a stack page included in the second region 430 to an application.

In FIG. 4B, a first region 450 indicates currently used stack pages and a second region 440 indicates a marking page. As shown in FIG. 4B, an application has been allocated another stack page. The current stack pointer 410 is a pointer for the second region 440 and indicates the marking page. Since the current stack pointer 410 points to the marking page, the memory management unit 310 generates a page fault and the fault cause analysis unit 321 recognizes that the generated page fault is caused by the marking page. The control unit 330 requests the compression unit 350 to compress a stack to a predetermined size from the start of a stack page allocated to the application. The operation of the compression unit 350 will be described later.

In FIG. 4C, a first region 460 indicates compressed stack pages, a second region 470 indicates a stack page that is empty due to compression, a third region 480 indicates currently used stack pages, a fourth region 490 indicates a non-allocated stack page, and a fifth region 440 indicates a marking page. As shown in FIG. 4C, the control unit 330 has requested compression from the compression unit 350. Stack pages compressed by the compression unit 350 are held in the first region 460 of the memory. The control unit 330 updates a page table for a stack page that becomes empty due to compression so as to release mapping information, and returns the first region 460 to the memory allocation unit 340. The control unit 330 is allocated a new page by the memory allocation unit 340, sets a new making page, updates the page table, and returns the right for control to the process of the application. The page table is used to control the memory in the operating system and is a data structure used in a virtual memory system of a computer operating system for storing the mapping between a virtual address and a physical address of the memory. The operating system can allocate another process to the second region 470 by indicating the stack page that becomes empty due to compression, thereby improving efficiency in memory usage.

The control unit 330 manages decompression of the compressed stack page. When the process of the application accesses the compressed stack pages in the memory, a currently referred memory is not mapped in the page table and thus the memory management unit 310 generates the page fault. Such an access may be made when the process of the application executes a pop command.

Upon the generation of the page fault, the fault cause analysis unit 321 recognizes that the fault is caused by the compressed stack pages. The control unit 330 then requests the compression unit 350 to decompress the compressed stack pages. At the request of the control unit 330, the compression unit 350 decompresses the compressed stack pages and the control unit 330 is allocated a physical memory where decompressed stack pages are to be located. The control unit 330 disposes the allocated new stack pages in logically consecutive places, performs mapping in the page table, and returns the right for control to the process of the application.

The memory allocation unit 340 exists in a kernel and allocates memory to a particular process of an application or an operating system. According to an embodiment of the present invention, for stack compression, the control unit 330 requests the compression unit 350 to compress a particular stack page, updates the page table for a stack page that becomes empty due to compression to release mapping information, and returns the stack page to the memory allocation unit 340. For stack decompression, the control unit 330 requests the memory allocation unit 340 to allocate physical memory where decompressed stack pages are to be located.

The compression unit 350 compresses a currently used stack page or decompresses a compressed stack page at the request of the control unit 330. The compression unit 350 may compress the stack page using any compression technique.

Figure 5:
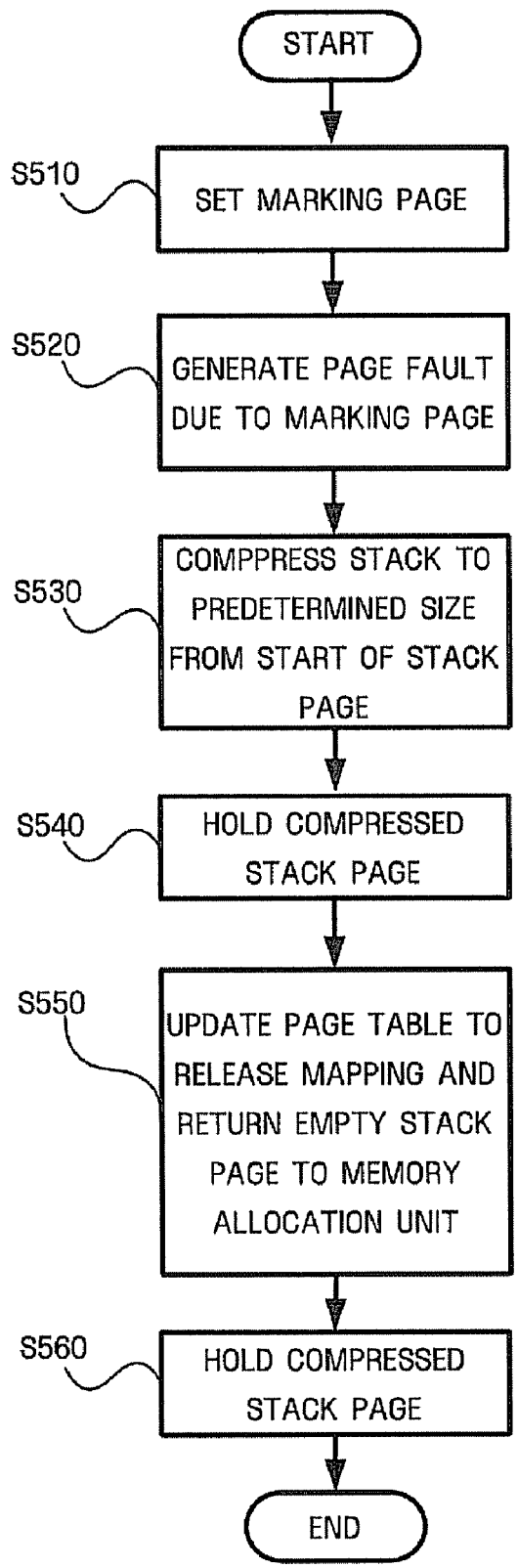
FIG. 5 is a flowchart of a technique of compressing a stack page according to an embodiment of the present invention.

FIG. 5 is a flowchart of a technique of compressing a stack page according to an embodiment of the present invention. The control unit 330 sets a marking page in a stack page of a memory in operation S510. If a process of an application uses a greater number of stack pages, the current stack pointer 410 points to the marking page and thus the memory management unit 310 generates a page fault in operation S520. Once the fault cause analysis unit 321 recognizes that the page fault is caused by the marking page, the compression unit 350 compresses a stack to a predetermined size from the start of a stack page allocated to the application in operation S530.

The control unit 330 then holds the compressed stack page in a specific region of memory in operation S540. In operation S550, the control unit 330 updates a page table for a stack page that becomes empty due to compression to release mapping information and returns the empty stack page to the memory allocation unit 340. The control unit 330 is also allocated a new page by the memory allocation unit 340 and sets a new marking page for the new stack page in operation S560.

Figure 6:
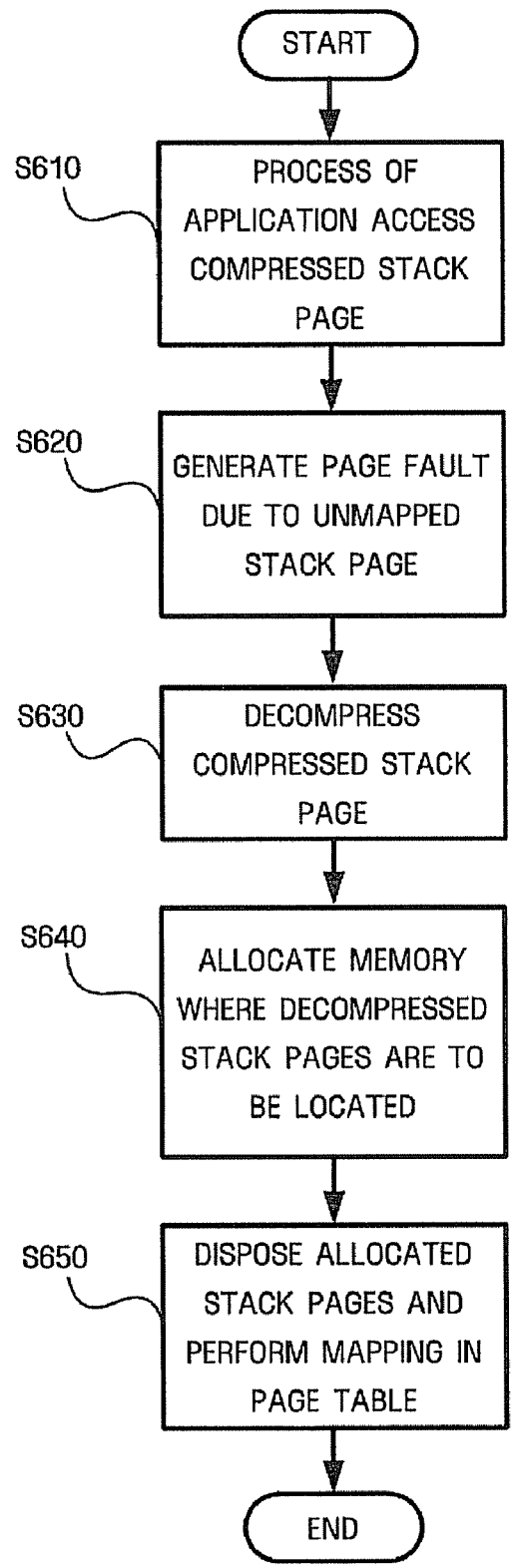
FIG. 6 is a flowchart of a technique of decompressing a stack page according to an embodiment of the present invention.

FIG. 6 is a flowchart of a technique of decompressing a stack page according to an embodiment of the present invention. A process of an application accesses a compressed stack page of a memory in operation S610. Since the referred memory is not mapped to a page table, the memory management unit 310 generates a page fault in operation S620. Once the fault cause analysis unit 321 recognizes that the page fault is caused by a compressed empty stack page, the control unit 330 requests the compression unit 350 to decompress the compressed stack page. In operation S630, the decompression unit 350 decompresses the compressed stack page. The control unit 330 is allocated a memory where decompressed stack pages are to be located in operation S640. The allocated new stack pages are disposed in logically consecutive places and mapping is performed in the page table in operation S650. Thereafter, the right for control is returned to the process of the application.

Memory management techniques according to aspects of the present invention may be recorded in computer-readable storage media including program instructions to implement various operations embodied by a computer. The media may also include, alone or in combination with the program instructions, data files, data structures, and the like. Examples of computer-readable storage media include magnetic media such as hard disks, floppy disks, and magnetic tape; optical media such as CDs and DVDs; magneto-optical media such as optical disks; and hardware devices that are specially configured to store and perform program instructions, such as read-only memory (ROM), random access memory (RAM), flash memory, and the like. The memory management techniques described above may also be embodied by transmission media, for example, a computer data signal embodied in a carrier wave comprising a compression source code segment and an encryption source code segment (such as data transmission through the Internet). The computer readable storage media can also be distributed over network coupled computer systems so that the computer readable code is stored and executed in a distributed fashion. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

As described above, according to aspects of the present invention, the operating system can acquire larger memory by stack page compression. The acquired memory can be used for other purposes, thereby allowing efficient memory usage and thus enabling a greater number of sub systems, middleware, and applications to use a larger memory space.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An apparatus to manage stacks for efficient memory usage, the apparatus comprising:
   a fault cause analysis unit to recognize a page fault caused by a marking page;
   a control unit to set the marking page, to request compression of a first stack page depending on whether a page fault occurs, to release a mapping of a second stack page that becomes empty due to the compression, and to return the second stack page;

a compression unit to compress the first stack page at the request of the control unit; and a memory allocation unit to receive the second stack page from the control unit and to allocate a new stack page to the control unit upon completion of the compression, wherein the fault cause analysis unit. the control unit, the compression unit. and the memory allocation unit are each controlled by a processor.

2. The apparatus of claim 1, wherein the marking page is at least one of an unmapped stack page, a read-only stack page, and a page that is set to cause the generation of the page fault when being written.

3. The apparatus of claim 1, wherein the control unit releases the mapping information by updating a page table.

4. The apparatus of claim 1, wherein the compressed first stack page is a stack page that is less frequently referred to by an application than other stack pages.

5. An apparatus to manage stacks for efficient memory usage, the apparatus comprising:

a fault cause analysis unit to recognize a page fault caused by a reference to a compressed stack page;

a control unit to request decompression of the compressed stack page, to receive an allocation of a memory where the decompressed stack page is to be located, to store the decompressed stack page in the allocated memory, and to perform mapping for the decompressed stack page;

a compression unit to decompress the compressed stack page at the request of the control unit; and a memory allocation unit to allocate the memory where the decompressed stack page is to be located, wherein the fault cause analysis unit, the control unit, the compression unit, and the memory allocation unit are each controlled by a processor.

6. The apparatus of claim 5, wherein the control unit performs the mapping by mapping the allocated memory in a page table.

7. A method for managing stacks for efficient memory usage, the method comprising:

setting a marking page in a first stack page;

generating a page fault due to the marking page;

requesting compression of a second stack page depending on whether a page fault occurs and compressing the second stack page in response to the request; and releasing a mapping of a third stack page that becomes empty due to the compression and returning the third stack page.

8. The method of claim 7, further comprising allocating a new stack page upon completion of the compression.

9. The method of claim 7, wherein the marking page is at least one of an unmapped stack page, a read-only stack page, and a page that is set to cause the generation of the page fault when being written.

10. The method of claim 7, wherein the releasing of the mapping comprises updating a page table.

11. The method of claim 7, wherein the compressed second stack page is a stack page that is less frequently referred to by an application in comparison to other stack pages.

12. A method for managing stacks for efficient memory usage, the method comprising:

accessing a compressed stack page of a memory by a process of an application;

generating a page fault due to the access;

requesting decompression of the compressed stack page and decompressing the compressed stack page in response to the request; and allocating a memory where the decompressed stack page is to be located and performing mapping for the decompressed stack page.

13. An apparatus to efficiently manage memory, the apparatus comprising:

a page fault analysis unit to recognize a page fault and to determine the cause of the page fault;

a compression unit to compress a stack page and to decompress the compressed stack page based on the determination of the page fault analysis unit; and a memory allocation unit to allocate memory where the decompressed stack page is to be located when the compression unit decompresses the compressed stack page and to allocate a new stack page to the control unit when the compression unit compresses the stack page to be compressed; and a control unit to control the compression unit and the memory unit based on the determination of the page fault analysis unit, wherein the page fault analysis unit. the compression unit, the memory allocation unit, and the control unit are each controlled by a processor.

14. The apparatus of claim 13, wherein:

the page fault analysis unit determines that the page fault is caused by the marking page;

the control unit, in response the determination, sets the marking page, controls the compression unit to compress the stack page to be compressed, releases a mapping of a stack page that becomes empty as a result of the compression, and returns the released stack page to the memory unit; and the memory allocation unit receives the released stack page from the control unit and allocates a new stack page to the control unit based on the released stack page when the compression unit compresses the stack page to be compressed.

15. The apparatus of claim 13, wherein:

the page fault analysis unit determines that the page fault was caused by accessing the compressed stack page;

the control unit, in response to the determination, requests the compression unit to decompress the compressed stack page, controls the memory unit to allocate a memory where the decompressed stack page is to be stored, stores the decompressed stack page in the allocated memory, and performs a mapping for the decompressed stack page; and the memory allocation unit allocates the memory where the decompressed stack page is to be stored based on the control of the control unit.

16. The apparatus of claim 13, wherein the memory allocation unit comprises a memory to hold a mapping of the stack pages.

17. A method of managing memory comprising:

setting a marking page in a first stack page;

determining that a page fault occurred due to the marking page;

compressing a second stack page;

releasing a mapping of a third stack page that becomes empty due to the compression of the second stack page;

determining that a page fault occurred due to accessing the compressed second stack page;

decompressing the compressed second stack page;

allocating memory for the decompressed second stack page;

performing a mapping for the decompressed second stack page.

18. The method of claim 17, further comprising:
holding the compressed second stack page in memory after the second stack page is compressed.

19. The method of claim 17, wherein the setting of the marking page comprises:

marking the first stack page as a read-only region; and
maintaining the first stack page as unmapped.

20. A computer readable medium comprising instructions that, when executed by a computer, cause the computer to perform the method of claim 17.

* * * * *